US012688596B2

(12) United States Patent (10) Patent No.: US 12,688,596 B2

Sommerfelt (45) Date of Patent: Jul. 21, 2026

---

(54) METHOD AND SYSTEM FOR DETECTION A LINE ABOVE GROUND FROM A HELICOPTER

(71) Applicant: Kleon Solutions AS, Førde (NO)

(72) Inventor: Arne Sommerfelt, Oslo (NO)

(73) Assignee: Kleon Solutions AS, Førde (NO)

( * ) Notice: Subject to any disclaimer, the term of this patent is extended or adjusted under 35 U.S.C. 154(b) by 373 days.

(21) Appl. No.: 18/566,571

(22) PCT Filed: May 25, 2022

(86) PCT No.: PCT/EP2022/064153

§ 371 (c)(1),
(2) Date: Dec. 1, 2023

(87) PCT Pub. No.: WO2022/253655

PCT Pub. Date: Dec. 8, 2022

(65) Prior Publication Data

US 2024/0257376 A1 Aug. 1, 2024

(30) Foreign Application Priority Data

Jun. 2, 2021 (NO) .................................... 20210695

(51) Int. Cl.
*G06T 7/593* (2017.01)
*G06T 7/254* (2017.01)
*G06T 7/73* (2017.01)

(52) U.S. Cl.
CPC .............. *G06T 7/593* (2017.01); *G06T 7/254* (2017.01); *G06T 7/74* (2017.01); *G06T 2207/10021* (2013.01); *G06T 2207/20224* (2013.01); *G06T 2207/30184* (2013.01); *G06T 2207/30261* (2013.01)

(58) Field of Classification Search
CPC ........... G06T 7/593; G06T 7/74; G06T 7/254; G06T 2207/20224; G06T 2207/30184; G06T 2207/30261
See application file for complete search history.

(56) References Cited

U.S. PATENT DOCUMENTS

2019/0087635 A1* 3/2019 Klaus ................... H04N 13/239

FOREIGN PATENT DOCUMENTS

| EP | 3 238 173 B1 | 10/2018 | |
| NO | 340705 B1 * | 6/2017 | .......... G06V 20/176 |
| WO | 2020/038944 A1 | 2/2020 | |

OTHER PUBLICATIONS

International Search Report issued in corresponding International Application No. PCT/EP2022/064153, mailed on Oct. 7, 2022 (5 pages).

(Continued)

*Primary Examiner* — Stephen R Koziol
*Assistant Examiner* — Raven Simone Jones
(74) *Attorney, Agent, or Firm* — Osha Bergman Watanabe & Burton LLP

(57) ABSTRACT

A method is for detecting a line above ground from a helicopter during landing of the helicopter in a terrain unfamiliar to the pilot. The method includes providing a first image from a first viewpoint and a second image from a second viewpoint by means of a monocular camera. The camera is mounted to the helicopter and directed towards the ground below the helicopter. The helicopter is in motion between the first viewpoint and the second viewpoint. The first image and the second image have an overlapping region. The method further includes performing an image registration process resulting in a mapping of image points in the first image to their corresponding image points in the (Continued)

second image; determining a common reference system; and determining a ground plane in the common reference system. The ground plane is a planar approximation of the ground. The method further includes determining a position and an orientation of the viewpoints in the common reference system; and using the results of the image registration to calculate a difference image comprising all image points of the overlapping region and the difference in pixel values between the corresponding image points at these image points of the overlapping region. The method further includes identifying any positive lines in the difference image having positive difference values; identifying any negative lines in the difference image having negative difference values; identifying the originating image for each positive line and each negative line; and identifying any compliant line pair as two lines where one originate from the positive lines and the other originate from the negative lines and where one originates from the first image and the other originate from the second image. The method further includes reconstructing a 3D line in the common reference system from each compliant line pair based on triangulation from the position and the orientation of the viewpoints; and determining that a line above ground is present if the reconstructed line is compliant with geometric constraints formed by the viewpoints and the ground plane.

11 Claims, 10 Drawing Sheets

(56) References Cited

OTHER PUBLICATIONS

Written Opinion issued in corresponding International Application No. PCT/EP2022/064153, mailed on Oct. 7, 2022 (10 pages).
A. Stambler et al.;"Detection and Reconstruction of Wires Using Cameras for Aircraft Safety Systems", 2019 International Conference on Robotics and Automation (ICRA), pp. 697-703; May 20, 2019 (7 pages).
Y. Lu et al.; "A Survey of Motion-Parallax-Based 3-D Reconstruction Algorithms"; IEEE Transactions on Systems, Man and Vybernetics, Part C: Applications and Review, vol. 31, No. 4, pp. 532-548; Nov. 2004 (17 pages).
Schenk, T .; "From point-based to feature-based aerial triangulation"; ISPRS Journal of Photogrammetry and Remote Sensing 58; pp. 315-329; Feb. 27, 2004 (15 pages).

* cited by examiner

A

LAG →

B

LAG →

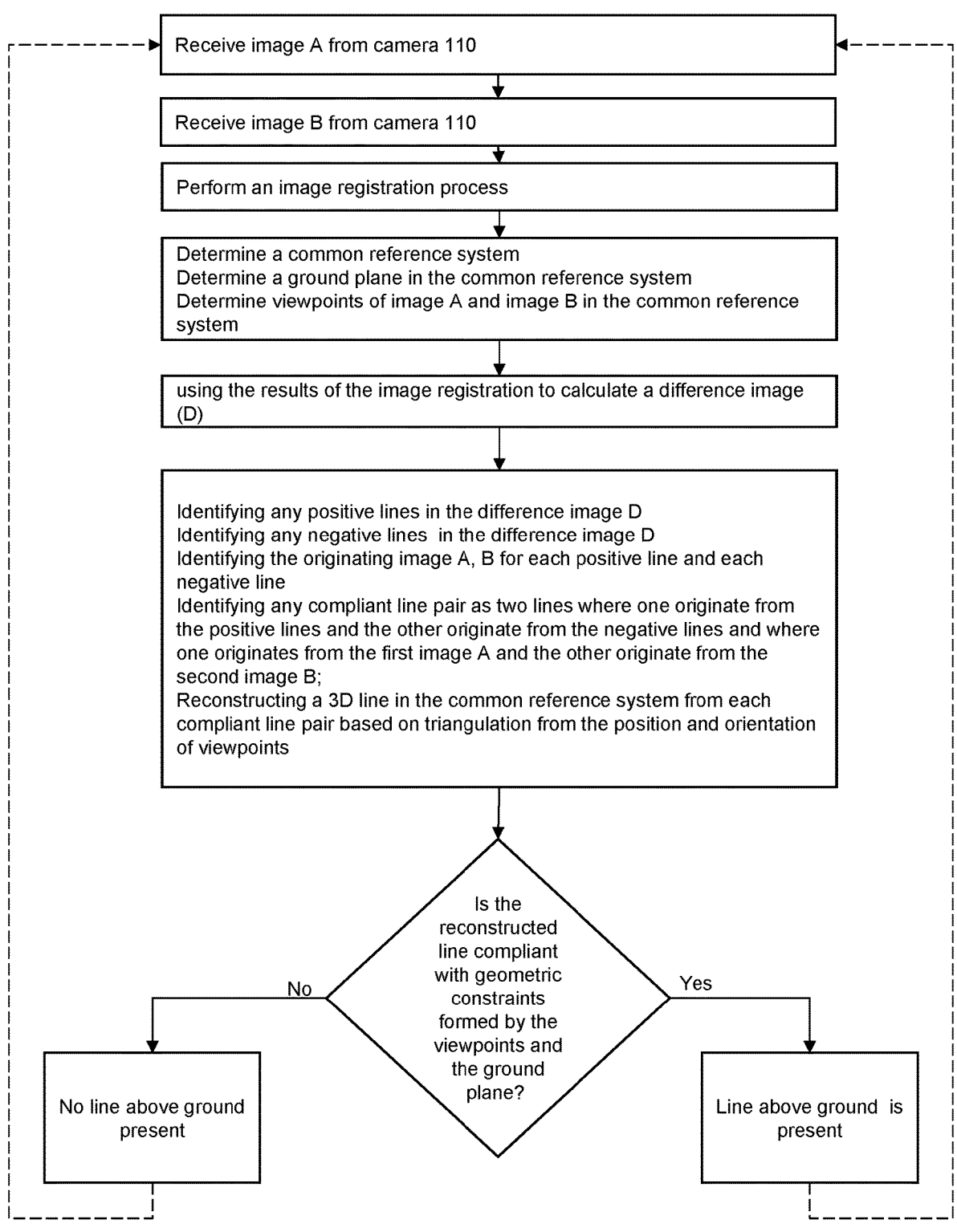

Receive image A from camera 110

Receive image B from camera 110

Perform an image registration process

Determine a common reference system
Determine a ground plane in the common reference system
Determine viewpoints of image A and image B in the common reference system using the results of the image registration to calculate a difference image (D)

Identifying any positive lines in the difference image D
Identifying any negative lines in the difference image D
Identifying the originating image A, B for each positive line and each negative line
Identifying any compliant line pair as two lines where one originate from the positive lines and the other originate from the negative lines and where one originates from the first image A and the other originate from the second image B;
Reconstructing a 3D line in the common reference system from each compliant line pair based on triangulation from the position and orientation of viewpoints Is the reconstructed line compliant with geometric constraints formed by the viewpoints and the ground plane?

No

Yes

No line above ground present

Line above ground is present

Fig 6

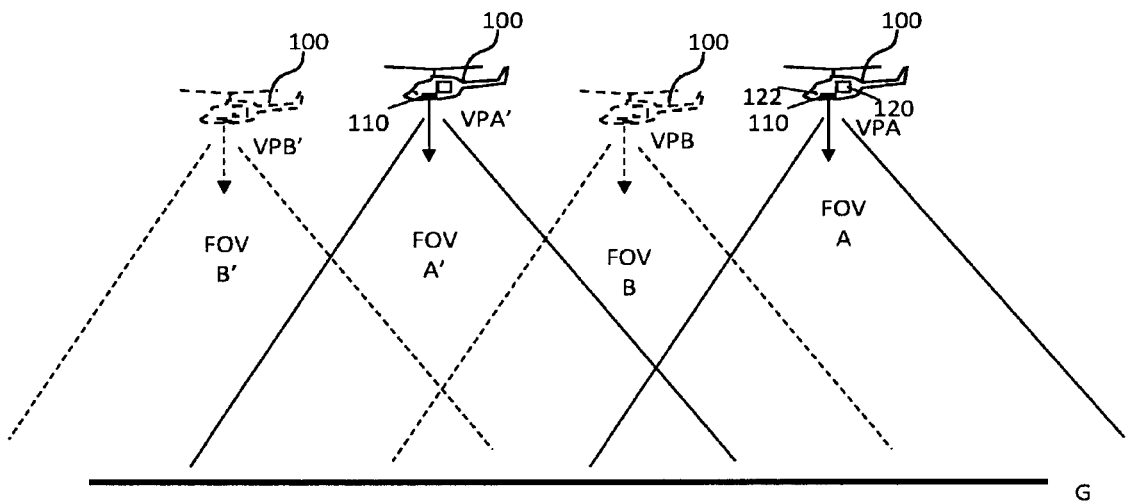
Fig. 7
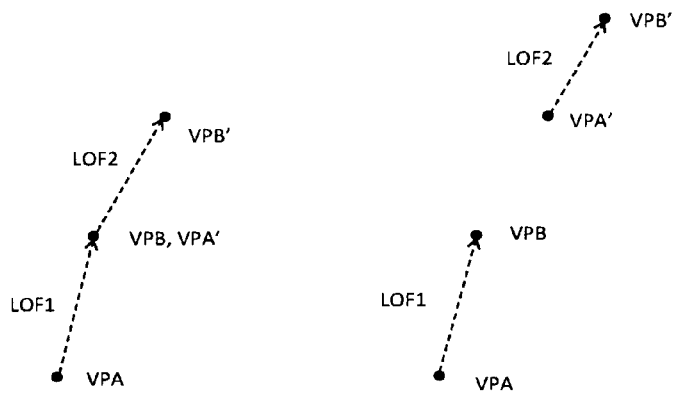
Fig. 8a                    Fig 8b

METHOD AND SYSTEM FOR DETECTION A LINE ABOVE GROUND FROM A HELICOPTER

FIELD OF THE INVENTION

The present invention relates to a method and system for detecting a line above ground from a helicopter.

BACKGROUND OF THE INVENTION

From time to time, fatal accidents occur due to a helicopter coming into contact with a line above ground such as power lines and telecommunication lines. Specifically, it is a challenge to avoid such lines above ground during landing of the helicopter in terrain unfamiliar to the pilot.

Often, lines above ground have such small dimensions (small width) that they are difficult to observe with the naked eye.

Traditionally, helicopter crews have avoided lines above ground by using maps in which known lines above ground are drawn in.

Consequently, within the field, there exists a general need for methods and devices for detecting lines above ground from a helicopter automatically.

Previously, solutions have been developed to detect lines above ground from a helicopter, wherein the solution is based on use of a camera and image processing techniques processing the image shot by the camera.

For example, EP-1 908 010 shows a system and a method for passive detection of lines from a helicopter. A digital image is captured from the helicopter. Firstly, the digital image is pre-processed to reduce noise which does not resemble lines. Then pixels are identified which may be classified as lines using a segment-finder module. Further, the identified pixels are linked in a linker module, to determine if a line-like structure is present. This generates a line overlay. The linker module comprises spatial and temporal filters. The spatial filter eliminates features in the image which are not consistent with lines, while the temporal filter eliminates pixels which do not fulfill a minimal image-to-image persistence. When a line is detected the pilot is warned.

In such warning systems it is desirable to improve the safety to ensure that warning is given when a line is actually present. At the same time, it is desirable to avoid a warning when an overhead cable is not present. In particular, this is the case when the line is seen with the ground below it as background. The ground may then have line-like patterns that may trigger an alarm even if they do not represent obstacles. This is a normal situation during a landing procedure in a non-regulated landing location.

NO 340705 describes a method for detecting a line above ground from a helicopter such as a helicopter having a pilot. Typically, the method is performed during a landing procedure for the helicopter. The method first comprises a step of providing, from a single camera arranged in said helicopter, a plurality of images of an area beneath said helicopter during motion of said helicopter. In a further step, the method comprises the step of detecting lines in the images, and further determining whether said lines represent lines at ground level or lines at a level above ground level. Then, the method comprises the step of determining whether a line at a level above ground level represents a possible line above ground. The step of determining whether the lines represent lines at ground level or lines at a level above ground level comprises identifying pairs of lines belonging together from said first and second images, respectively, identifying a background in each of said first and second images, associated with the pairs of lines, and determining if a line and its associated background have shifted more than a predetermined limit from said first to said second image, and if so, determining if the line represents a line at a level above a ground level.

It is an object of the invention to provide an alternative method for detecting lines above ground from a helicopter.

SUMMARY OF THE INVENTION

The present invention relates to a method for detecting a line above ground from a helicopter during landing of the helicopter in a terrain unfamiliar to the pilot, wherein the method is comprising the steps of:

providing a first image from a first viewpoint and a second image from a second viewpoint by means of a monocular camera, wherein the camera is mounted to the helicopter and directed towards the ground below the helicopter; and wherein the helicopter is in motion between the first viewpoint and the second viewpoint and wherein the first image and the second image has an overlapping region;

performing an image registration process resulting in a mapping of image points in the first image to their corresponding image points in the second image;

determining a common reference system;

determining a ground plane in the common reference system, wherein the ground plane is a planar approximation of the ground;

determining a position and an orientation of the viewpoints in the common reference system;

using the results of the image registration to calculate a difference image comprising all image points of the overlapping region and the difference in pixel values between the corresponding image points at these image points of the overlapping region;

identifying any positive lines in the difference image having positive difference values;

identifying any negative lines in the difference image having negative difference values;

identifying the originating image for each positive line and each negative line;

identifying any compliant line pair as two lines where one originate from the positive lines and the other originate from the negative lines and where one originates from the first image and the other originate from the second image;

reconstructing a 3D line in the common reference system from each compliant line pair based on triangulation from the position and the orientation of the viewpoints;

determining that a line above ground is present if the reconstructed line is compliant with geometric constraints formed by the viewpoints and the ground plane.

In one aspect, the method uses one camera. In one aspect, the camera is a monocular camera.

In one aspect, each viewpoint has a unique position and a unique viewpoint in the common reference system.

In one aspect, the step of determining that a line above ground is present further comprises the steps of:

for each compliant line pair, for each epipolar line intersecting both lines in the compliant line pair, identifying corresponding image points in the first and second images;

determining that a line above ground is present if the corresponding image points for the compliant line pair have compliant pixel values.

In one aspect, the steps of identifying any first lines and identifying any second lines comprises the step of:

using a Hough transformation algorithm.

In one aspect, the method further comprises the following step before the step of performing an image registration process:

performing a pre-processing of the first image and/or the second image to reduce the effect of variation in noise, motion blur, lighting or exposure between the images.

In one aspect, the method further comprises the following step before the step of performing an image registration process:

performing a pre-processing of the first image and/or the second image to reduce the effect of variation in noise, motion blur, lighting or exposure between the images.

In one aspect, the step of determining the common reference system is comprising:

determining the common reference system based on the image registration process and an image projection model of the camera.

Alternatively, the common reference system may be determined by means of data from sensors resulting in a specific position and orientation of the helicopter. The sensor for measuring the specific position of the helicopter may be a GPS sensor. The sensor for measuring the orientation of the helicopter may be a gyroscope, or a magnetic compass and accelerometer, etc.

In one aspect, the method comprises a step of determining a scale of the common reference system by:

using an altimeter; or using height data from a GPS sensor and map data; or using a distance between the first and second viewpoints by means of data from a GPS sensor.

By using the scale of the common reference system, the geometric constraints can be absolute values in meters etc. Alternatively, the geometric constraints can be relative values, for example values relative to the helicopter's height above ground.

In one aspect, the method comprises the steps of:

storing images from the camera in a data structure;

selecting the first image and the second image from the data structure as two images having an overlapping region.

In one aspect, the method comprises the steps of:

performing optical flow computations in addition to, or as part of, the image registration process.

In one aspect, the method comprises the steps of:

providing a further first image from a further first viewpoint and a further second image from a further second viewpoint by means of the monocular camera, wherein the camera is mounted to the helicopter and directed towards the ground below the helicopter; and wherein the helicopter is in motion between the further first viewpoint and the further second viewpoint and wherein the further first image and the second image has an overlapping region;

performing an image registration process resulting in a mapping of image points in the further first image to their corresponding image points in the further second image;

determining a position and an orientation for the further viewpoints in the common reference system;

using the results of the image registration to calculate a further difference image comprising all image points of the overlapping region and the difference in pixel values between the corresponding image points at these image points of the overlapping region;

identifying any positive lines in the further difference image having positive difference values;

identifying any negative lines in the further difference image having negative difference values;

identifying the originating further image for each positive line and each negative line;

identifying any compliant line pair as two lines where one originate from the positive lines and the other originate from the negative lines and where one originates from the further first image and the other originate from the further second image;

reconstructing a 3D line in the common reference system from each compliant line pair based on triangulation from a position and an orientation of the viewpoints;

determining that a line above ground is present if the reconstructed line is compliant with geometric constraints formed by the further viewpoints and the ground plane; wherein a first line of flight between the first viewpoint and the second viewpoint is not parallel with a second line of flight between the further first viewpoint and the further second viewpoint.

In one aspect, the further first image from the further first viewpoint is the first image from the first viewpoint or the second image from the second viewpoint.

In one aspect, the overlapping region between the first image and the second image is corresponding to 90% of the area of the first image and/or the second image.

In one aspect, the overlapping region between the further first image and the first image is corresponding to at least 40% of the area of the first further image and the first image.

The present invention also relates to a system for detecting a line above ground from a helicopter, wherein the system comprises:

a camera mounted to the helicopter and directed towards the ground below the helicopter;

a signal processor connected to the camera, wherein the signal processor is configured to perform the steps of the method above.

In one aspect, the system comprises:

a pilot user interface connected to the signal processor and located in the cockpit of the helicopter, wherein the signal processor is configured to issue a warning to the pilot via the pilot user interface if it is determined that a line above ground is present.

LIST OF DRAWINGS

Figures 4A, 4B:
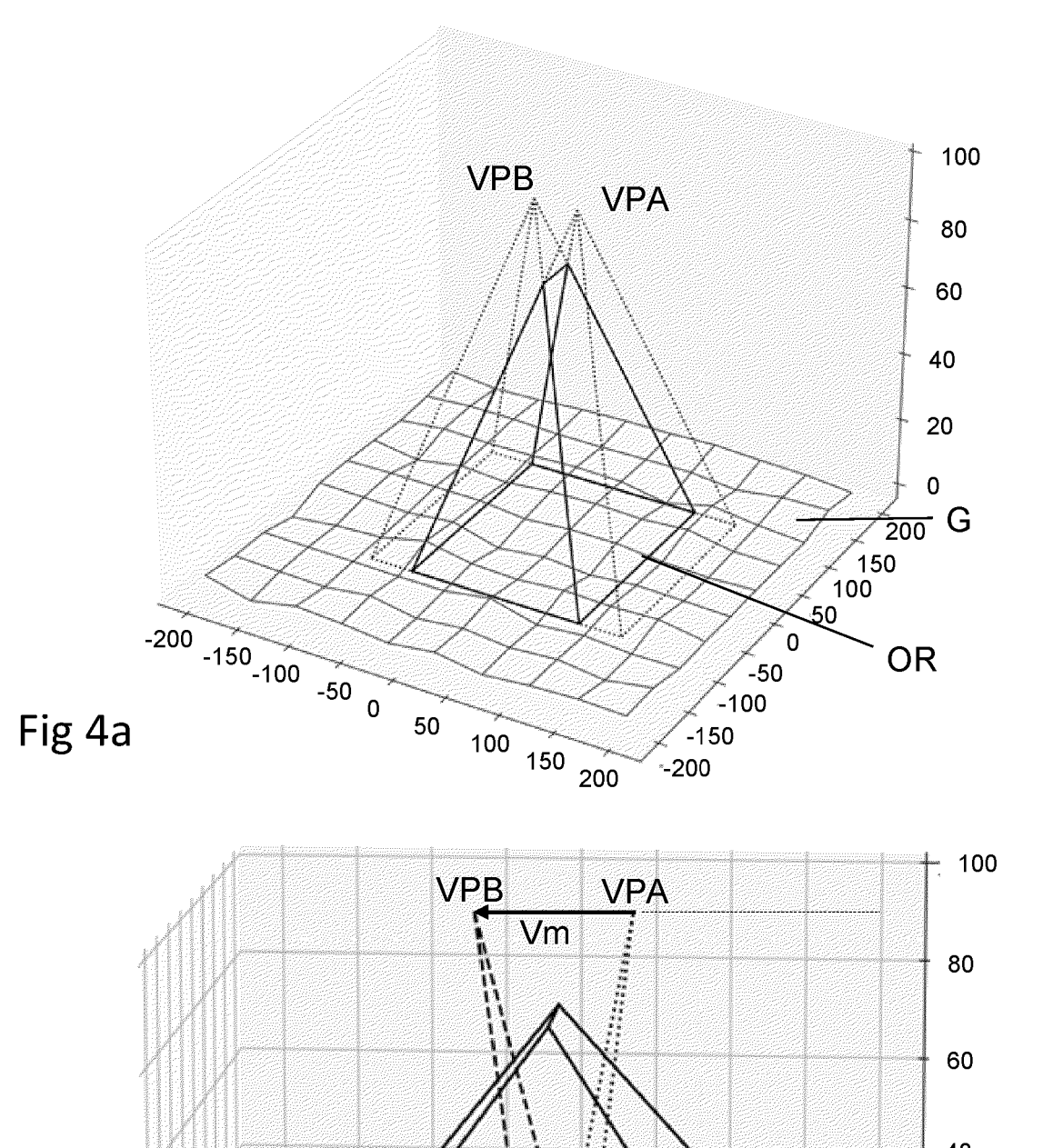
FIG. 4a illustrates a 3D model of the volume above ground being analysed for a line above ground.
Figure 4C:
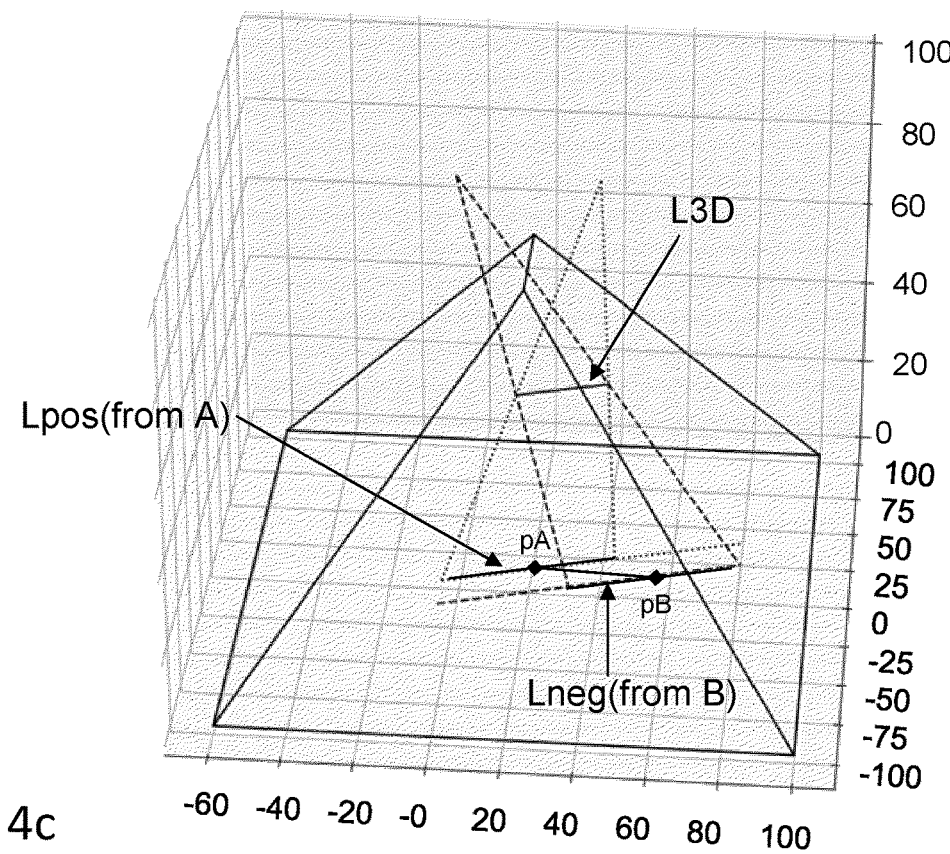
Figure 4D:
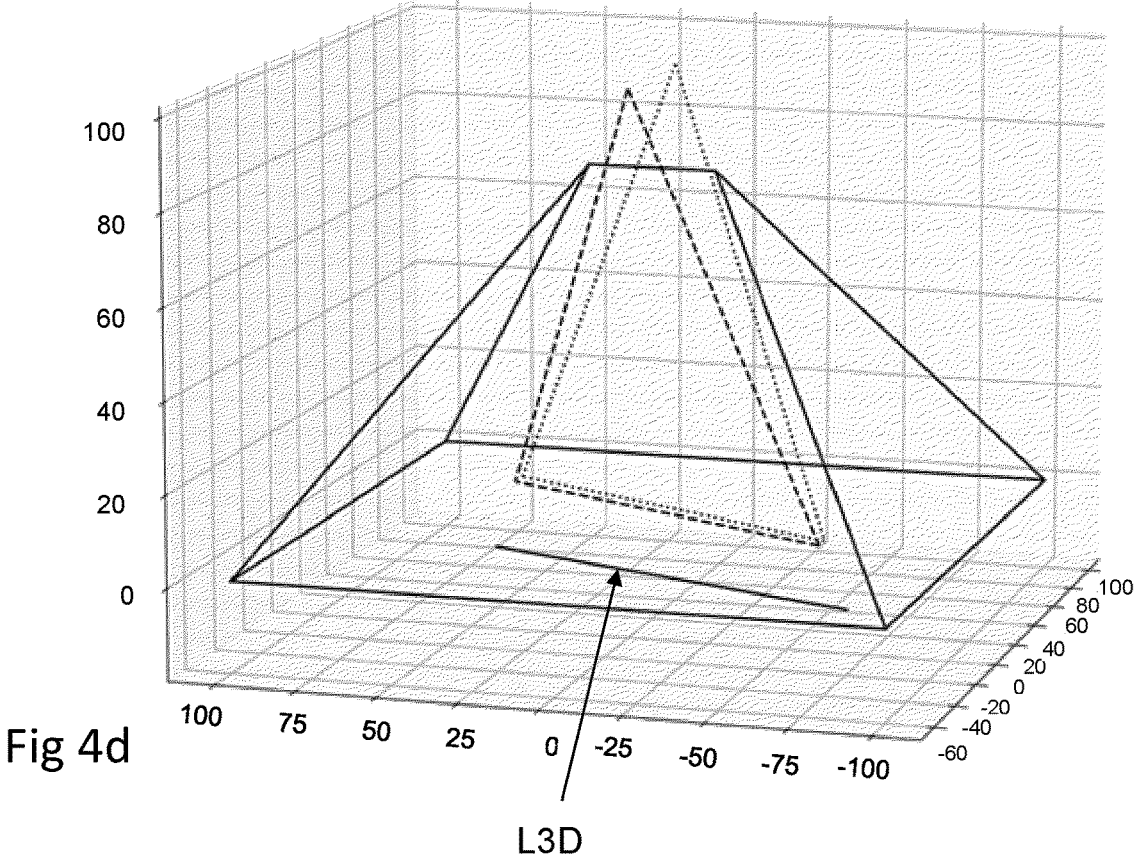
Figure 5:
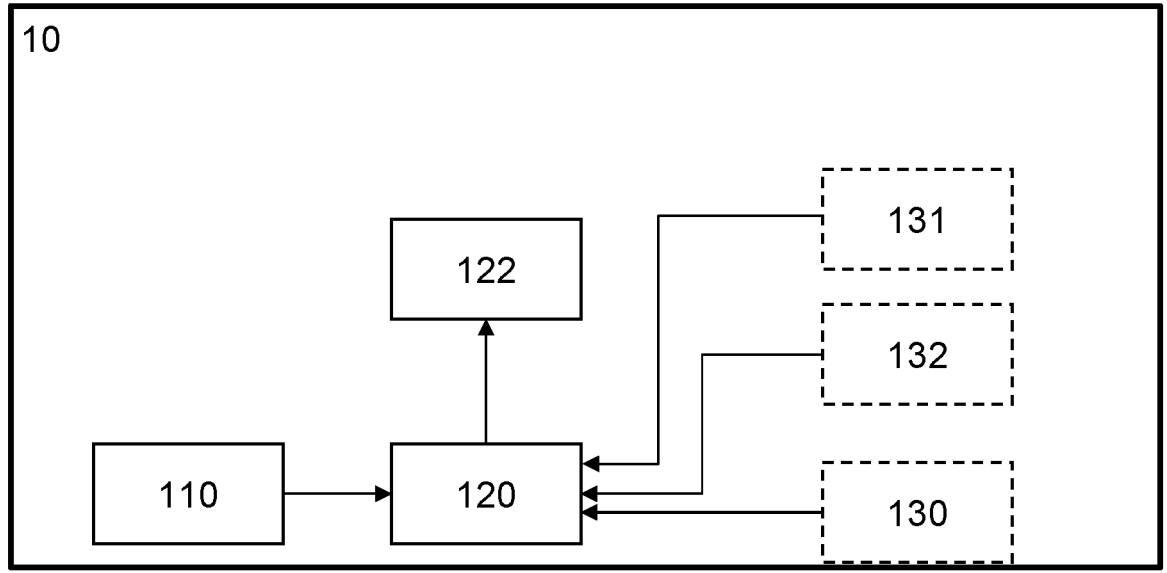

FIG. 4*b* illustrates a line above ground within a 3D model;

FIG. 4*c* illustrates a line in the 3D model which is not a line above ground;

FIG. 4*d* illustrates a line in the 3D model which is not a line above ground;

FIG. 5 illustrates a flow scheme of the steps of the method of a first embodiment.

FIG. 6 illustrates the parts of a system for detecting a line above ground LAG from a helicopter 100;

FIG. 7 illustrates the helicopter in four different positions during a landing operation;

FIG. 8*a* illustrates the first line of flight and the second line of flight for the helicopter between three viewpoints;

FIG. 8*b* illustrates the first line of flight and the second line of flight for the helicopter between four viewpoints.

DETAILED DESCRIPTION

Embodiments of the present invention will now be described in detail. Initially, some terms will be discussed.

Image Representation and Capture

In this description we refer to images as a central concept in our invention. Normally the intuitive and general understanding of an image is applicable. There are however steps in our method that assume more specific details of how the image is represented. In our context an image is always a digitized two-dimensional (2D) perspective projection of a scene in the three-dimensional (3D) physical world. At each point in the image, defined by two coordinates, there is associated a pixel. The pixel describes physical properties of the corresponding point in the physical scene. Typically this will be the intensities of light reflected in specific spectral bands that together represent the color at that point in the scene. The process of creating a digital representation of an image is commonly referred to as image capture. The typical captured image is represented as a numerical tensor with 3 axes, often denoted as rows, columns and depth. There is a one-to-one mapping between row- and column indices and the image projection. The depth axis enumerates the physical property values of the pixel,—e.g. the color given as red, green and blue intensity components. Normally we do not use the term tensor, but rather describe the image as a matrix of pixels, where each pixel may be represented by multiple values. The number of pixel values is also known as the pixel depth. Examples and figures in our description will for the sake of simplicity assume single valued pixels, also known as monochrome images. There is no inherent limitation to the pixel depth that our method can use.

During image capture the typical first step is to have camera optics that project light from the scene onto a solid state sensor. The elements of the sensor matrix are also often referred to as pixels or specifically sensor pixels. Note that sensor pixels are physical elements and different from numerically represented pixel that we refer to in our method description. Sensor pixels are normally arranged in a rectangular grid. During digitization the analogue physical properties captured by each sensor pixel are converted to numeric values, forming a raw image matrix of numerical pixels.

Camera Calibration and Image Interpolation

The optical projection of the scene onto the sensor will in general be an approximate or distorted perspective projection because of inherent properties of the optical lens. One essential effect of this is that straight lines will not appear straight in the raw image. There are well known methods to correct the projection through a process, called camera calibration, where a mathematical model of the distortion is created. Camera calibration is done one time for each specific configuration of camera and optics. After calibration the raw image can be undistorted and thus represent a correct perspective projection of the scene. This is a standard image transformation step. Throughout the description of our method one may assume that the images are undistorted. An accurate undistorted version of the image matrix is typically created by interpolating the pixel values of the raw image matrix at non integer row/column positions determined by the distortion model. In general image interpolation allows us to look at an image as a continuously defined function at any coordinate and not only at the integer valued row/column-position of each pixel. When we refer to image points in our description, we think of these as defined by two real valued coordinates. The pixel value at an image point is computed as an interpolation of the pixel values in the image matrix that are close to the point.

Image Registration

A central concept in our method is to do image registration. Image registration algorithms are considered known for a person skilled in the art. The term refers to computing a coordinate mapping function between an image point qA in image A and a point qB in image B such that qA and qB are projections of the same physical scene point. It is assumed that the images overlap, i.e. they project parts of the same scene and that the mapping is continuous and valid within the overlap. Note that the mapping function also defines the overlap since it can determine that a point qA maps to a point qB that is outside the pixel matrix of B and thus not part of the overlap.

The parameters of the mapping function is typically computed by locating and matching a sparse (eg. 10-1000 point pairs) set of corresponding points and then use this set to compute the parameters of a continuous mapping function. In its simplest form a mapping can be an affine transformation that may work well for a planar scene seen from a distance. At closer distances a homography may work better because it models the perspective transformation of a plane better than the affine transform. A more complex model can take into account local projection differences caused by a nonplanar scene. One way to do this is to compute the Essential Matrix (see Essential Matrix page on Wikipedia.org), E, based on use of a calibrated camera and the corresponding points found. A method to determine E from five or more corresponding points pairs is well known. The Essential Matrix describes the 3D motion of the camera and its perspective between image A and B. Given any point qA, E can be used to compute a line in B, called the epipolar line of qA, along which the corresponding point qB must be located. This allows for efficient search and computation of a registration map that models a general non-planar ground scene at the cost of more computations. This type of modelling is well established in the field of stereo vision and is often referred to as a disparity map. We want to emphasize that even if computations known from stereo vision can be exploited by our invention, it does not depend on a stereo camera. Stereo cameras capture 3D scene information instantly while our method extracts 3D scene information over time from a moving monocular camera.

One may also choose to compute a Fundamental Matrix (see Fundamental Matrix page on Wikipedia.org) and use it in a similar manner as the Essential Matrix. This requires more corresponding points to be used, but does not require all of the intrinsic parameters of the camera model to be known. The intrinsic non-linear distortion parameters of the lens would still be needed.

There exists methods, often referred to as bundle adjustment (see Bundle Adjustment page on Wikipedia.org), that are able to determine all intrinsic model parameters (up to scale) of a camera simply by moving the camera along a path that produces a series of overlapping images. Our method could in principle use such a method, but it is computationally expensive and would have to be completed before any obstacle detection. In this way it is similar to any other procedure used to calibrate the camera.

Similarity Assumptions of Registration

In practice, alle the registration mapping models described above will be based on some assumptions about the scene in relation to the resolution limit given by the image sensor-matrix. The initial set of corresponding pairs is typically found by matching a local neighbourhood of pixels in A and B. In order to do this match efficiently and reliably the corresponding neighbourhoods in A and B should have a similar scaling and it should not have different occlusions by protruding objects when seen from the different perspective of A and B. In practice this means firstly, that the change in the camera's point of view between A and B must be limited, and secondly, that the scene must be smooth in the sense that there are only minor occlusion changes between the two points of perspective. A suitable landing ground, as observed and evaluated by the pilot in the helicopter during the landing operation, will normally comply with these criteria. This will be discussed further in detail below.

Computing the Image Overlap Difference

The purpose of image registration in our method is to be able to compare the pixel values of two images A and B at all points in the overlap. The comparison result is computed as a difference image D, comprising image points qD of the overlapping region OR with pixel values calculated by subtracting the pixel value at point qA in the first image A from the pixel value at the corresponding image point qB in the second image B (or vice versa). Typically image D will be computed as an image matrix by use of image interpolation at corresponding points in a suitable rectangular grid.

We have explained that image registration assumes sufficient smoothness of the scene in order to succeed. When the scene is actually smooth, the image of the overlapping region in image A and image B will be identical and the pixels of image D will be close to zero or close to the inherent noise level of the system. When the scene contains non-smooth objects, like trees or powerlines, these will create significant non-zero pixel values in D that appear as image artifacts emanating from the parallax and occlusions created by different viewpoints. These image artifacts are most easily detected by computing the difference between the registered images where they overlap.

Description of the Method Steps

Figure 1:
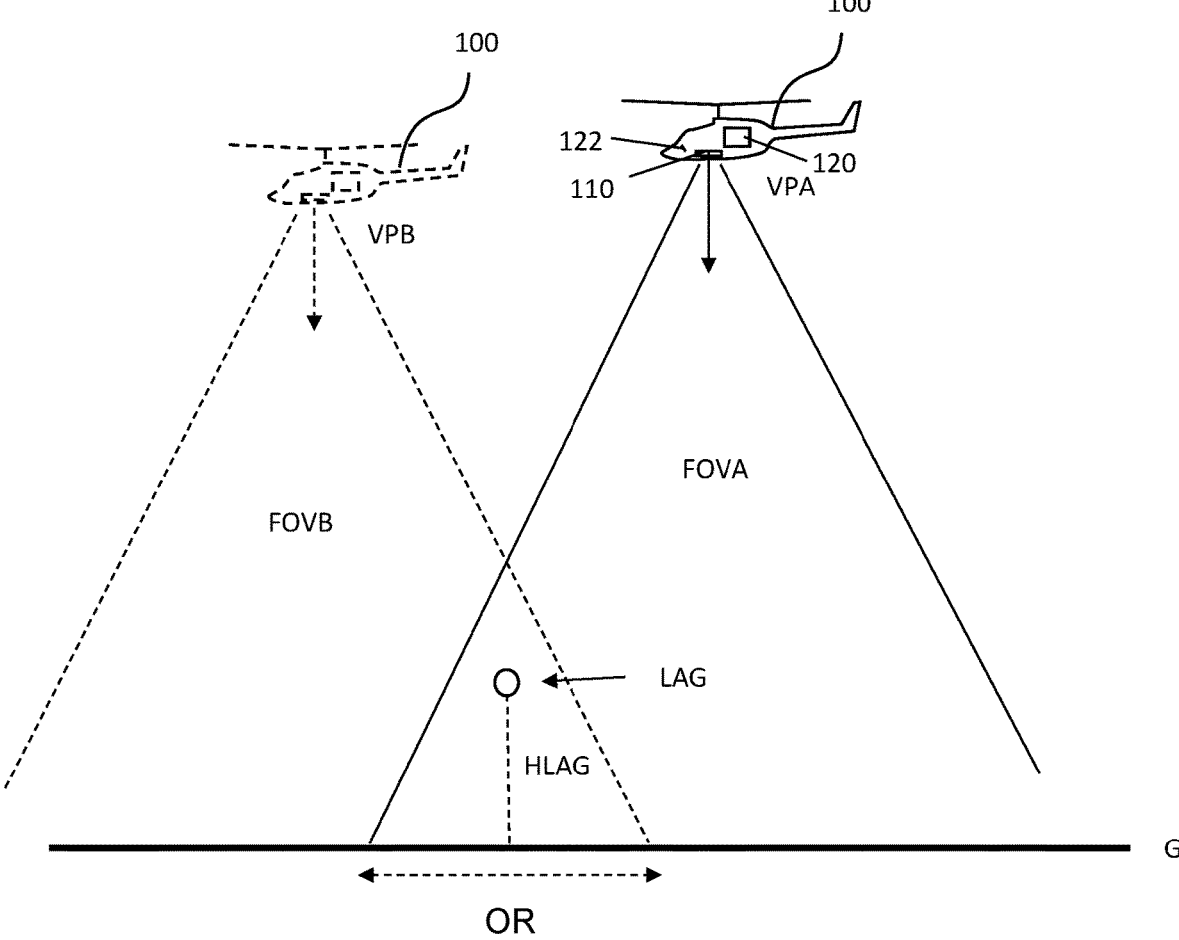
FIG. 1 illustrates a helicopter in two different positions during a landing operation, where a line above ground is present near the landing area.

Initially, it is referred to FIG. 1, where a helicopter 100 is shown flying above ground G during a landing operation or during preparation of a landing operation. The helicopter 100 comprises a camera 110 mounted to the helicopter 100 and directed towards the ground G below the helicopter 100. The camera 110 is a part of a system 10 (shown in FIG. 5) for detecting a line above ground LAG from the helicopter 100. The camera 110 is connected to a processing unit 120 for processing images received by the camera 110. The processing unit 120 may comprise, or may be connected to, a pilot user interface 122 in the cockpit of the helicopter 100.

The present embodiment is a method for analysing images captured by the camera 110 during the landing operation and to warn the pilot via the pilot user interface 122 if the method detects that a line above ground LAG is present. Typically, most images will not contain any line above ground LAG. The example below is an example where a line above ground is present.

A line above ground LAG is here referring to a cable (such as an electric cable, a signal cable etc.), a line (a power transmission line etc.) or a rope etc. suspended from or between vertical poles, towers, etc at a distance HLAG above ground. Such lines above ground will typically be extending substantially parallel to the ground. The line above ground LAG may also be a guy rope for supporting a vertical pole, such as guy ropes for radio towers etc. Such guy ropes will typically be oriented with an angle between the radio tower and ground.

The above types of lines above ground LAG represent a risk for the helicopter 100 during the landing operation. The above types of line above ground LAG are also difficult to observe visually by the pilot, as they have a relatively thin diameter. Hence, when such lines are detected, it should result in a warning being sent to the pilot.

It should be mentioned that there may be many lines on the ground itself in images captured by the camera 110, which do not represent a risk for the helicopter 100 during the landing operation. Such lines may be road markings, curbs in urban areas, and it may be railroad tracks, thinner tree trunks in a logging area etc. Detection of such lines should not result in a warning being sent to the pilot.

It should be mentioned that some assumptions about the landing ground conditions can be made. First, the pilot must be able to visually observe the ground G. This is a safety requirement for most landing operations with helicopters. Hence, a camera, which also relies on visibility will be applicable in all conditions where a helicopter is allowed to land. Second, it can be assumed that the ground G being analysed in the present method is generally flat and obstacle free in an area spanning typically more than two times the diameter of the helicopter rotor. Also, there will be a limit on the general inclination of the ground relative to the horizontal plane. It may further be assumed that there are no other obstacles for the helicopter to land and further that the vegetation on the ground is sufficiently small to allow the helicopter to land. In the present invention there is no assumption that the entire field of view from the camera has landing ground conditions. Plainly visible landing obstacles like trees, power line masts and buildings may be present in the field of view and may or may not be marked as obstacles by the algorithm. In these cases an obstacle warning is not essential and maybe not even desirable. As discussed above, the objective of the method is to detect these hard-to-see lines above ground LAG in the part of the field of view that appears to be a possible landing ground.

There is one limitation of the present system. If the helicopter is moving in a straight line of flight and there is a line above ground LAG parallel to the line of flight, then the method according to the present invention cannot detect the line above ground LAG. In practice, this can be avoided by flying the helicopter in a curve or some other non-linear path towards a promising landing location.

In FIG. 1, a first position of the helicopter is indicated by solid lines, where a first viewpoint VPA is indicating both a position for the camera 110 when a first image A is captured and a direction in which the camera 110 is oriented when the first image A is captured. This orientation may for example be expressed as a 3D vector, which will include information about yaw, roll, and pitch of the helicopter. Consequently, the first viewpoint VPA has six degrees of freedom, three representing the position in space and three representing the orientation in space. In FIG. 1, also the field of view FOVA is indicated as the area of the ground being covered by this first image A.

In FIG. 1, a second position of the helicopter is indicated by dashed lines, where a second viewpoint VPB has six degrees of freedom, three representing the position in space and three representing the orientation in space. The image taken from the second viewpoint VPB is referred to as a second image B. In FIG. 1, also the field of view FOVB is indicated as the area of the ground being covered by the second image B. The area of the ground being covered in both the first image A and the second image B is referred to as an overlapping region OR.

It should be noted that each of the viewpoints VPA and VPB have a limited field of view, as indicated by the triangles FOVA, FOVB in FIG. 1 and indicated as pyramids in FIG. 4*a*.

Figures 2A, 2B:
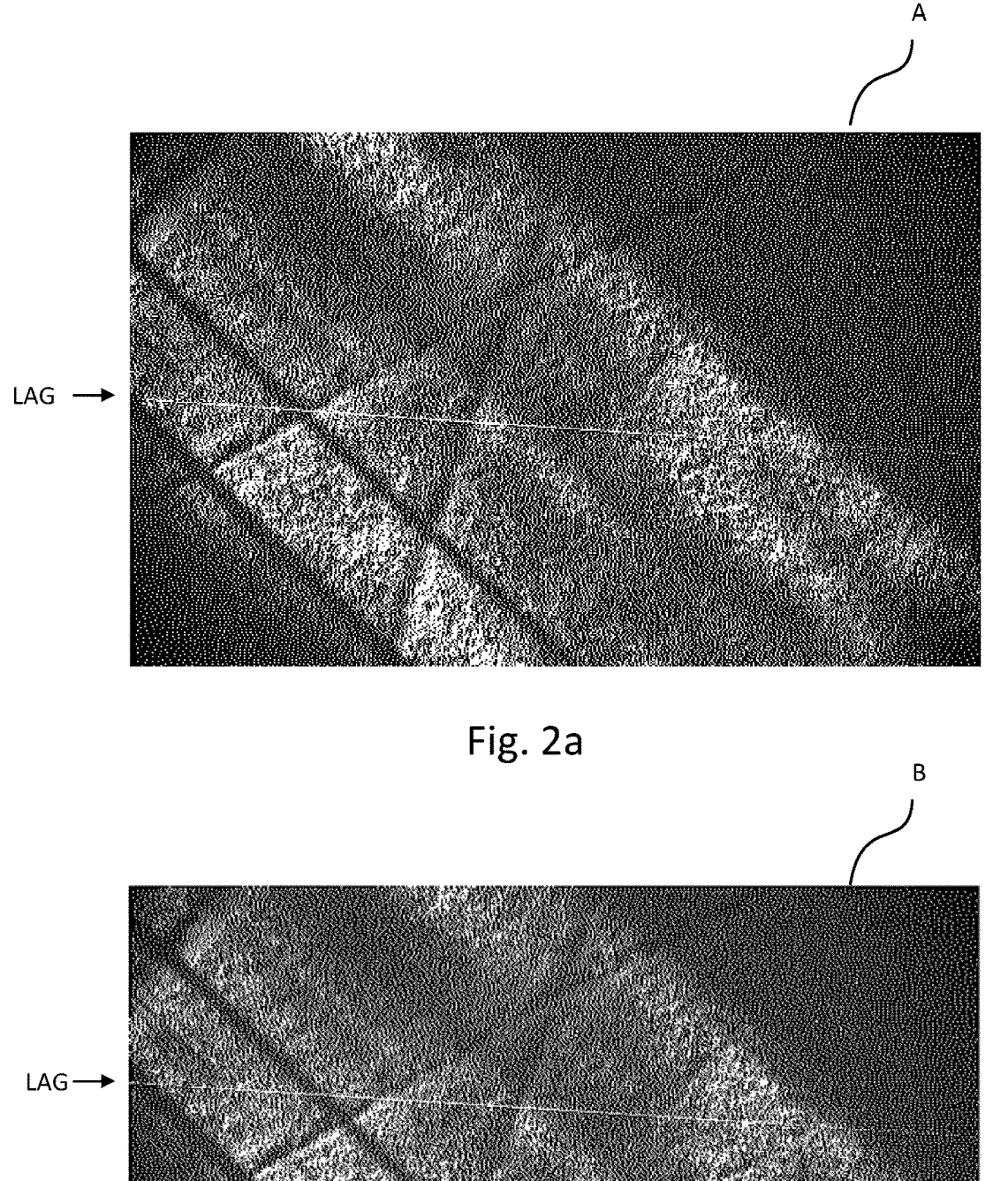
FIG. 2a illustrates an image A, taken from the helicopter at the first position.
FIG. 2b illustrates an image B, taken from the helicopter at the second position.
Figures 2C, 2D:
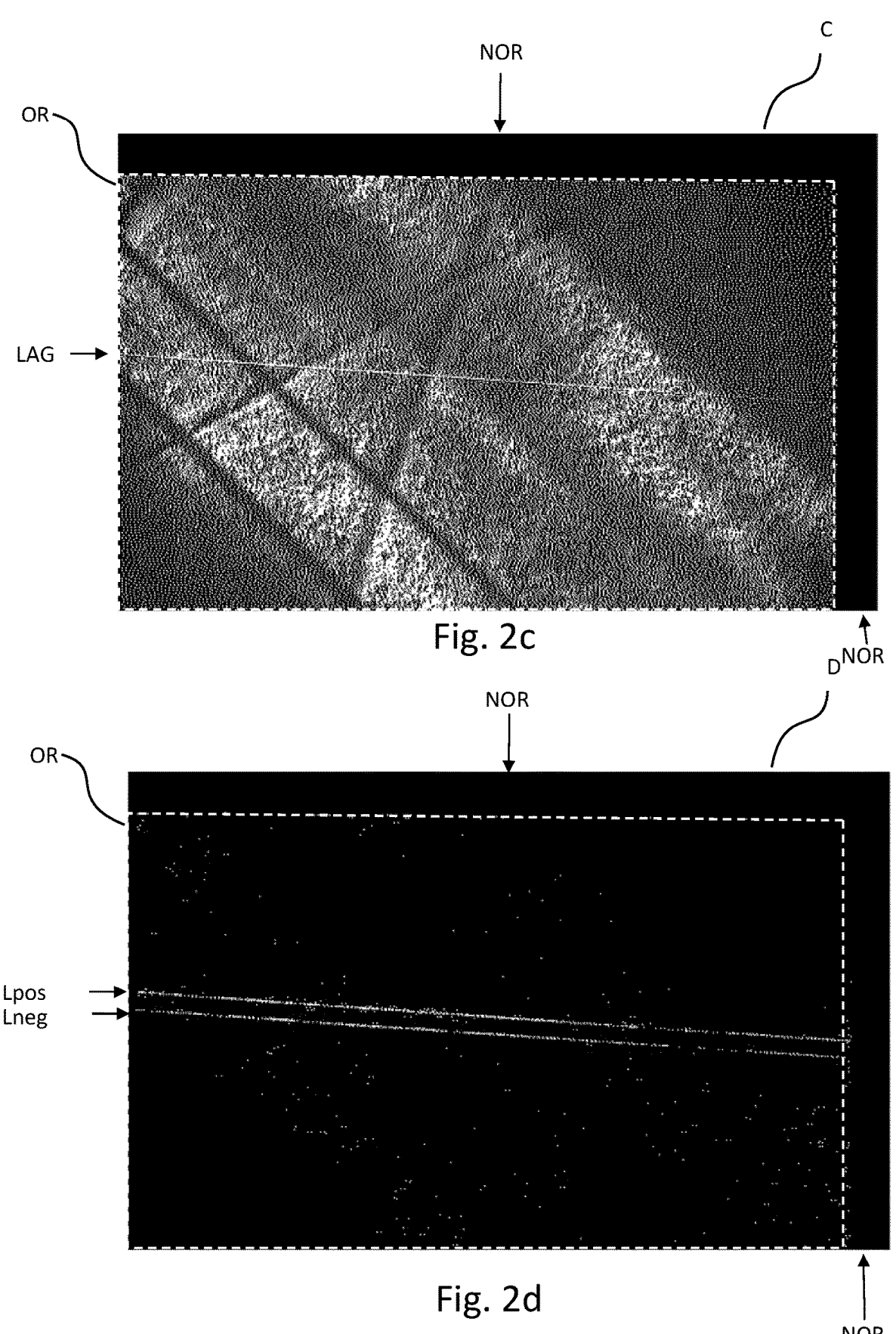
FIG. 2c illustrates a result of an image registration process as an image C.
FIG. 2d illustrates a difference image D.

The steps of the method for detecting a line above ground LAG from the helicopter 100 will now be described in detail. In FIG. 2*a*, an example of the first image A is shown. One known line above ground LAG is visible as a thin line in the image. The line above ground LAG is here a power line. In FIG. 2*b*, an example of the second image B is shown. Also here the line above ground LAG is visible as a thin line in the image. It can be seen that there are similarities in first image A and the second image B. In FIG. 2*c*, the overlapping region OR in the first image A and the second image B is shown as a dashed box. The area outside of the overlapping region OR is denoted a not overlapping region NOR.

It should also be noted that there are many lines in the first image A and the second image B. These lines are not lines above ground, they are track marks on the ground.

Computing the Image Overlap Difference

The purpose of image registration in our context is to be able to compare two images A and B at all points in the overlap. The image registration has also been discussed in general above.

The image registration map is used to calculate a difference image D comprising image points qD of the overlapping region OR. The difference image D is calculated by subtracting the pixel value at point qA in the first image A from the pixel value at the corresponding image point qB in the second image B (or vice versa). Typically D will be computed as an image matrix by use of image interpolation at corresponding points in a suitable rectangular grid.

FIG. 2*d* shows the difference image D. For most of the image points in D, the pixel values will be close to zero because they represent the difference between the pixel values of identical scene points even if they are captured from two different viewpoints and at two different points in time. Zero valued pixels are shown as black in FIG. 2*d*.

As shown in FIG. 2*d*, there are two parallel white lines. The pixel at the image points of the upper line have positive values and is indicated as Lpos, while the pixels at image points of the bottom line have negative values and is indicated as Lneg. In addition, there are also some white dots scattered around in the image D, these may have negative or positive values not apparent in the figure, but these points will in any case be discarded by the line detection algorithm.

These lines represent the parallax created by a line above ground against its background when seen from two different viewpoints.

It should be noted that at this step of the description the method has not yet identified these lines as a line above ground LAG yet.

To improve the results of the image registration process, the method may comprise the step of performing a pre-processing of the first image A and/or the second image B to reduce the effect of variation in noise, motion blur, lighting or exposure between the images A, B.

The Reference System

Figure 3:
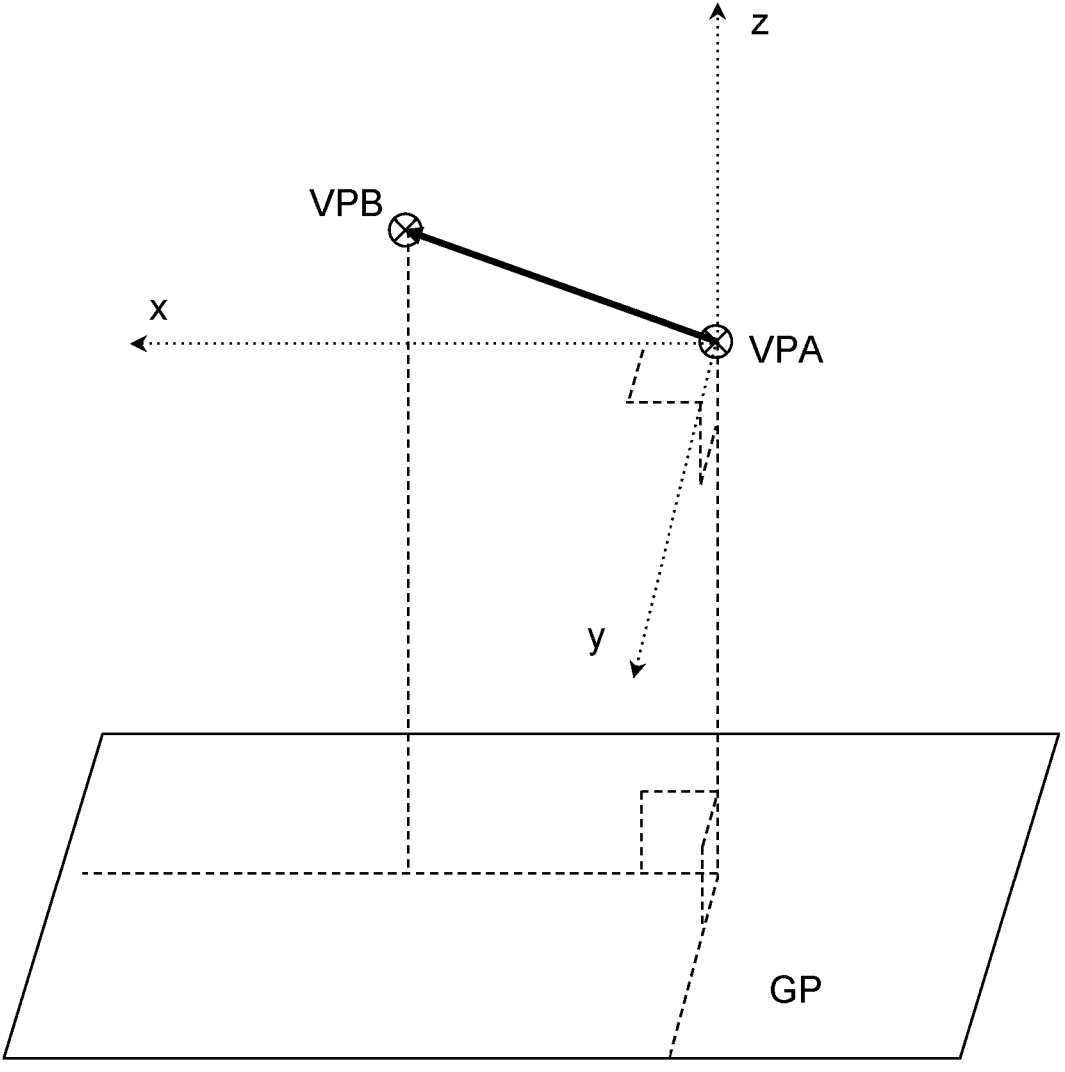
FIG. 3 illustrates the common reference system used in the method.

It is now referred to FIG. 3. Here it is shown a three-dimensional reference system with two horizontal axes x and y and a vertical axis z. The vertical axis z is defined as being perpendicular to a ground plane GP which is a planar approximation of the ground G. As discussed above, it can be assumed that the ground is relatively flat.

In FIG. 3 it is also shown that the first viewpoint VPA is selected as origo in the reference system.

The practical importance of choosing this reference system is that it makes it simple to quantify the height above ground for a line above ground when its coordinates are given in this reference system.

It is now referred to FIG. 4*a*. Here, the ground G is shown to be even relative to the height of the helicopter as indicated by the first viewpoint VPA and the second viewpoint VPB.

However, the ground G is not shown to be entirely flat. This relatively even ground G is shown in FIG. 4*a* for illustrative purposes only, to illustrate the assumption made above that the ground G is even as it is a possible landing area identified by the pilot. In the context of the geometric model of the complete scene including the camera movement we assume the ground to be represented as a geometric plane that is an approximation of the landing ground.

Each viewpoint VPA, VPB is here illustrated as a pyramid (with dashed lines), while the overlapping space between the two viewpoints VPA, VPB is indicated by solid lines. The base of the overlapping space corresponds to the overlapping region OR.

The results of the above image registration process are now used to determine the viewpoints (i.e. a location and an orientation of the viewpoints) VPA, VPB in the common reference system of FIG. 3. This is performed by decomposing the above essential matrix and triangulating ground points found during the image registration process. In addition, an image projection model of the camera 110 may be used. The image projection model is a model containing properties of the lens of the camera and the distance between the lens and the sensor of the camera.

It should be noted that a fundamental limitation to 3D reconstruction using a monocular camera, as here, is that the scale of the model is unknown. The scale is not needed to find or determine that a line above ground is present. It is only needed to quantify how far above ground the line is and compare it to a height threshold in order to decide whether it represents an obstacle or not. In practice uncertainty can be accepted in the scale input at the cost of a slightly higher risk of alerting on obstacles that are below the set detection height threshold. If for example the desired detection threshold is set to 1 m above ground and the scale input is +25% accurate the detection threshold can be adjusted to 0.75 m to allow for the uncertainty of the scale. Possible ways to set scale from external input include any single or combined input of the following:

A measure of the height above ground, possibly computed from map data, a ground radar, a stereo-camera, an altimeter or even the pilot's assessment. As shown in FIG. 5, the system 10 comprises a GPS sensor 130 and map information 132 from a map navigation system to set scale. Alternatively, as shown in FIG. 5, the system 10 may comprise an altimeter 131 to set scale.

A measure of the distance travelled by the helicopter between VPA and VPB, which can be extracted from an on-board inertial- or GPS-instrument.

A measure of distance between any two points on the ground seen by the camera in a single image.

It should be noted that the present invention will be able to determine that a line above ground LAG is present without scaling of the common reference system. The above threshold can be set as a relative value, for example as 2% of the helicopter's height above ground, and the helicopter is 100 m above ground, it means that lines 2 m or more above ground will result in a warning. If the helicopter subsequently descends to 50 m without changing the relative threshold, any line above 1 m will give a warning. Thus, we see that a relative threshold can have a desirable effect in becoming more conservative as the helicopter approaches the ground.

It is now referred to FIG. 4b again. If the first viewpoint VPA was selected as origo in the common reference system, the ground plane GP may be determined as a planar approximation of the ground G. This approximation can be computed by triangulating corresponding points (qA,qB) in image A and B, and thus determine their 3D position relative to VPA. Several numerical optimization methods are available for fitting the plane parameters to the set of points by minimizing a suitable cost function. Robust techniques like RANSAC (see Random Sample Consensus page on Wikipedia.org), are able to ignore points that deviate significantly from the plane, e.g. points on nearby trees bordering the landing ground, and is hence one example of a numerical optimization method which is suitable for determining the ground plane GP in the common reference system.

Line Identification

In a next step, the difference image D is analysed to identify lines in the difference image D. It should be noted that a line can extend over the entire difference image D. It should be noted that the term line may also refer to a line segment extending only over a part of the difference image D.

Algorithms for identifying line segments in an image are known for a person skilled in the art. One such algorithm is the Hough transformation algorithm.

Figure 2E:
FIG. 2e illustrates an image E resulting from a filtering transformation of the difference image D in FIG. 2d that enhances the image feature of interest.

Because of noise in the sensor data and registration inaccuracies the initial difference image will have mostly non-zero pixel values. The noise level will have local variations in its magnitude due to registration inaccuracies and ground texture properties. Thus pre-processing is performed on the difference image to normalize the noise level in a way that a uniform threshold equal to 1 can be used to create a binary image where only significant difference pixels are non-zero. Each pixel of the significant difference image will have a depth of two, where the first value is non-zero if and only if the normalized difference is above 1 and the second value is non-zero only if the normalized difference is below −1. The significant difference image D shown in FIG. 2d and shows a white dot where either one of the two pixel components is non-zero. The figure thus does not distinguish negative from positive significant pixel. For the line-like patterns clearly seen in the figure this is instead indicated by the Lpos/Lneg labels. In FIG. 2e we illustrate the result of the line detection based on input from D. This image is not actually produced by the detection algorithm rather it is shown here to show the noise reducing effect of the line detection. The line-like structures have been identified and are shown as two solid lines while all the other significant pixels in D have been identified as noise and consequently ignored.

Positive lines Lpos in the difference image are identified solely from the first value of each pixel in D. Then any negative lines Lneg are identified solely from the second value of each pixel in D.

It must also be determined whether a line originates from image A or B. This cannot be determined from D. Instead the corresponding pixels of A and B that correspond with the line must be examined. Assume a positive line has been found in D, then it must either originate from a dark line against a lighter background in A or a light line against a darker background in B. We use the registration to map the line-points back to the A and B images in turn and compute the average pixel value difference between the line points and their local surroundings. The image origin (A or B) of the line is then selected based on where the average line-background difference best matches the difference found in D.

In the present example shown in FIG. 2e, the positive line Lpos is originating from the second image B, while the negative line Lneg is originating from the first image A. Consequently, the positive line Lpos from FIG. 2d is indicated as Lpos (from B) in FIG. 2e, and the negative line Lneg from FIG. 2d is indicated as Lneg (from A) in FIG. 2e.

Then, compliant line pairs are identified. A compliant line pair is defined as two lines where one originate from the positive lines Lpos and the other originate from the negative lines Lneg and where one originates from the first image A and the other originate from the second image B.

Hence, two positive lines are not a compliant line pair, two negative lines are not a compliant line pair. Similarly, one positive line originating from image A and a negative line originating from image A are not a compliant line pair. It should be noted that the position, direction, width or length of the lines forming a compliant line pair are not evaluated or analysed at this stage.

If or when a compliant line pair is identified, a 3D line referred to as L3D is reconstructed in the common reference system from each compliant line pair based on triangulation from the viewpoints VPA, VPB.

One such reconstructed line L3D is shown in FIG. 4b. Here, the reconstructed line L3D has been reconstructed from a compliant line pair formed by the positive line Lpos (from A) and the negative line Lneg (from B).

In a final step, the reconstructed line L3D is analysed. It is determined that a line above ground LAG is present if the reconstructed line L3D is compliant with geometric constraints formed by the viewpoints VPA, VPB, the ground plane GP and the common reference system.

In FIG. 4b, the line L3D is considered to be compliant with geometric constraints, as the line L3D has a height above the ground plane GP and below the first and second viewpoints VPA, VPB.

A further geometric constraint fulfilled by the line L3D is that it is substantially parallel with the ground plane VPA. It should be noted that this is not necessarily a required geometric constraint, as the method may be used to identify guy ropes for radio towers etc. as discussed above.

It is now referred to FIG. 4c where a geometrically non-compliant line-pair is illustrated. A positive line Lpos, is shown as a dotted line projected onto the ground plane, and a negative line Lneg, shown as a dashed line projected onto the ground plane. The reconstructed line L3D, does not violate the constraints formed by the viewpoints and the ground plane. Note that in our figure the epipolar lines are parallel to the horizontal grid lines shown on the ground plane because the movement of the viewpoint is parallel to these lines. We then determine the set of corresponding point pairs (pA on Lpos, and pB on Lneg) that intersect the same epipolar line. Points on any of the observed lines (Lpos or Lneg) that are not part of this set of corresponding pairs cannot belong to the same physical line in the scene and thus indicates that the lines are not geometrically compliant. The segment of Lpos that has epipolar correspondence with Lneg is illustrated as a dotted triangle. Likewise, the segment of Lneg that has epipolar correspondence with Lpos is illustrated as a dashed triangle. We then notice that the upper-right part of Lpos and lower left part of Lneg do not have correspondence. Since these parts are substantial they cannot be explained by noise. This leads to the conclusion that the lines are not geometrically compliant.

It is now referred to FIG. 4d, where another geometrically non-compliant line-pair is illustrated. In this case the reconstructed 3D line (L3D) is determined to be below the ground plane, which is not possible in the physical scene.

It should be noted that the above process is an iterative process performed repeatedly during the preparation for the landing operation, as indicated by dashed arrows in FIG. 6. Hence, as illustrated in FIG. 7, after the above method steps in which the image A and image B have been analysed, the above method steps are repeated for a further image A' represented as field of view FOV A' in FIG. 7 from a further viewpoint VPA' and a further image B' represented as field of view FOV B' in FIG. 7 from a further viewpoint VPB', both received from the camera.

It should be noted that the further image A' may be image A or image B from the previous iteration, i.e. a new image is always used together with the previous image in a sequence of images. In FIG. 8a this is shown schematically, with image B from the second viewpoint VPB being identical to the first further image A' from the first further viewpoint VPA'. In FIG. 8a, a first line of flight LOF1 between the first viewpoint VPA and the second viewpoint VPB and a second line of flight LOF2 between the further first viewpoint VPA' and the further second viewpoint VPB' are indicated.

Alternatively, the further first image A', the further second image B', the first image A and the first image B are four different images. This is shown schematically in FIG. 8b, with the four images A, B, A', B' indicated as four different viewpoints VPA, VPB, VPA', VPB'. Also here the first line of flight LOF1 between the first viewpoint VPA and the second viewpoint VPB and the second line of flight LOF2 between the further first viewpoint VPA' and the further second viewpoint VPB' are indicated.

As discussed above, the main criterium is that the two images being used during an iteration have an overlapping region OR. Preferably, also the first image A has an overlapping region with the second further image B'. In this way, the ground below the helicopter is analysed at least twice. It should be noted that in practice, the overlapping region OR between each image may be larger than illustrated in FIG. 7. As an example, the camera may capture images having ca 90% overlap. The field of view FOVB may have 90% overlap with the field of view FOVA. In addition, the field of view of the third or fourth image in the series of images, represented by field of view FOVB', may have 40% overlap with the field of view FOVA.

As discussed above, the method has a limitation related to the specific case where the helicopter is moving in a straight line of flight in parallel with a line above ground LAG, in such a case the line above ground LAG cannot be detected. It should be noted that within image processing, the movement between the first viewpoint and the second viewpoint will always be considered to be a straight line of flight.

However, this will not represent a challenge as long as the first line of flight LOF1 is not parallel with the second line of flight LOF2. Should the line above ground LAG be parallel with the first line of flight, it will not be parallel with the second line of flight and the line above ground will be determined in the second iteration.

In practice, the above limitation will not be perceived as a real limitation of the method. All landing operations with a helicopter in a terrain unfamiliar to the pilot involve visual evaluation of one or more promising landing locations, which itself require a non-linear movement of the helicopter towards the one or more promising landing locations. Hence, there will be many occurrences where the first line of flight LOF1 will not be parallel with the second line of flight LOF2.

The invention claimed is:

1. A method for detecting a line above ground from a helicopter during landing of the helicopter in a terrain unfamiliar to the pilot, wherein the method comprises:

providing a first image from a first viewpoint and a second image from a second viewpoint by means of a monocular camera, wherein the camera is mounted to the helicopter and directed towards the ground below the helicopter; and wherein the helicopter is in motion between the first viewpoint and the second viewpoint and wherein the first image and the second image have an overlapping region;

performing an image registration process resulting in a mapping of image points in the first image to their corresponding image points in the second image;

determining a common reference system;

determining a ground plane in the common reference system, wherein the ground plane is a planar approximation of the ground;

determining a position and an orientation of the viewpoints in the common reference system;

using the results of the image registration to calculate a difference image comprising all image points of the overlapping region and the difference in pixel values between the corresponding image points at these image points of the overlapping region;

identifying any positive lines in the difference image having positive difference values;

identifying any negative lines in the difference image having negative difference values;

identifying the originating image for each positive line and each negative line;

identifying any compliant line pair as two lines where one originate from the positive lines and the other originate from the negative lines and where one originates from the first image and the other originate from the second image;

reconstructing a 3D line in the common reference system from each compliant line pair based on triangulation from the position and the orientation of the viewpoints; and determining that a line above ground is present if the reconstructed line is compliant with geometric constraints formed by the viewpoints and the ground plane.

2. The method according to claim 1, wherein determining that a line above ground is present further comprises:

for each compliant line pair, for each epipolar line intersecting both lines in the compliant line pair, identifying corresponding image points in the first and second images; and determining that a line above ground is present if the corresponding image points for the compliant line pair have compliant pixel values.

3. The method according to claim 1, wherein the steps of identifying any first lines and identifying any second lines comprises:

using a Hough transformation algorithm.

4. The method according to claim 1, wherein the method further comprises before performing an image registration process:

performing a pre-processing of the first image and/or the second image to reduce the effect of variation in noise, motion blur, lighting, or exposure between the images.

5. The method according to claim 1, wherein of determining the common reference system comprises:

determining the common reference system based on the image registration process and an image projection model of the camera.

6. The method according to claim 1, wherein the method comprises determining a scale of the common reference system by:

using an altimeter; or using height data from a GPS sensor and map data; or using a distance between the first and second viewpoints by means of data from a GPS sensor.

7. The method according to claim 1, wherein the method comprises:

storing images from the camera in a data structure; and selecting the first image and the second image from the data structure as two images having an overlapping region.

8. The method according to claim 1, wherein the method comprises:

performing optical flow computations in addition to, or as part of, the image registration process.

9. The method according to claim 1, wherein the method comprises:

providing a further first image from a further first viewpoint and a further second image from a further second viewpoint by means of the monocular camera, wherein the camera is mounted to the helicopter and directed towards the ground below the helicopter; and wherein the helicopter is in motion between the further first viewpoint and the further second viewpoint and wherein the further first image and the second image has an overlapping region;

performing an image registration process resulting in a mapping of image points in the further first image to their corresponding image points in the further second image;

determining a position and an orientation for the further viewpoints in the common reference system;

using the results of the image registration to calculate a further difference image comprising all image points of the overlapping region and the difference in pixel values between the corresponding image points at these image points of the overlapping region;

identifying any positive lines in the further difference image having positive difference values;

identifying any negative lines in the further difference image having negative difference values;

identifying the originating further image for each positive line and each negative line;

identifying any compliant line pair as two lines where one originate from the positive lines and the other originate from the negative lines and where one originates from the further first image and the other originate from the further second image;

reconstructing a 3D line in the common reference system from each compliant line pair based on triangulation from a position and an orientation of the viewpoints; and determining that a line above ground is present if the reconstructed line is compliant with geometric constraints formed by the further viewpoints and the ground plane;

wherein a first line of flight between the first viewpoint and the second viewpoint is not parallel with a second line of flight between the further first viewpoint and the further second viewpoint.

10. A system for detecting a line above ground from a helicopter, wherein the system comprises:

a camera mounted to the helicopter and directed towards the ground below the helicopter;

a signal processor connected to the camera, wherein the signal processor is configured to perform a method for detecting a line above ground from a helicopter during landing of the helicopter in a terrain unfamiliar to the pilot, wherein the method comprises:

providing a first image from a first viewpoint and a second image from a second viewpoint by means of a monocular camera, wherein the camera is mounted to the helicopter and directed towards the ground below the helicopter; and wherein the helicopter is in motion between the first viewpoint and the second viewpoint and wherein the first image and the second image have an overlapping region;

performing an image registration process resulting in a mapping of image points in the first image to their corresponding image points in the second image;

determining a common reference system;

determining a ground plane in the common reference system, wherein the ground plane is a planar approximation of the ground;

determining a position and an orientation of the viewpoints in the common reference system;

using the results of the image registration to calculate a difference image comprising all image points of the overlapping region and the difference in pixel values between the corresponding image points at these image points of the overlapping region;

identifying any positive lines in the difference image having positive difference values;

identifying any negative lines in the difference image having negative difference values;

identifying the originating image for each positive line and each negative line;

identifying any compliant line pair as two lines where one originate from the positive lines and the other originate from the negative lines and where one originates from the first image and the other originate from the second image;

reconstructing a 3D line in the common reference system from each compliant line pair based on triangulation from the position and the orientation of the viewpoints; and determining that a line above ground is present if the reconstructed line is compliant with geometric constraints formed by the viewpoints and the ground plane.

11. The system according to claim 10, wherein the system comprises:

a pilot user interface connected to the signal processor and located in the cockpit of the helicopter, wherein the signal processor is configured to issue a warning to the pilot via the pilot user interface if it is determined that a line above ground is present.

\* \* \* \* \*